US009638272B2

(12) United States Patent
Olkkonen et al.

(10) Patent No.: US 9,638,272 B2
(45) Date of Patent: May 2, 2017

(54) ELECTROMAGNETIC BRAKE, A BRAKE, AND A METHOD FOR MAKING A BRAKE

(71) Applicants: Mika Olkkonen, Hyvinkaa (FI); Antti Saarelainen, Espoo (FI)

(72) Inventors: Mika Olkkonen, Hyvinkaa (FI); Antti Saarelainen, Espoo (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 14/063,133

(22) Filed: Oct. 25, 2013

(65) Prior Publication Data

US 2014/0048359 A1 Feb. 20, 2014

Related U.S. Application Data

(63) Continuation of application No. PCT/FI2012/050436, filed on May 4, 2012.

(30) Foreign Application Priority Data

May 12, 2011 (FI) ...................................... 20115463

(51) Int. Cl.
*F16D 59/02* (2006.01)
*F16D 55/06* (2006.01)
(Continued)

(52) U.S. Cl.
CPC ............. *F16D 55/06* (2013.01); *F16D 59/02* (2013.01); *F16D 65/0006* (2013.01);
(Continued)

(58) Field of Classification Search
CPC ...... F16D 55/06; F16D 65/0006; F16D 65/28; F16D 2121/22; F16D 65/2121;
(Continued)

(56) References Cited

U.S. PATENT DOCUMENTS 4,535,874 A    8/1985 Pollinger et al.
4,640,390 A    2/1987 Saumweber et al.
(Continued)

FOREIGN PATENT DOCUMENTS

DE    29706124 U1    6/1997
DE    19925173 A1    12/2000
(Continued)

OTHER PUBLICATIONS

International Search Report of PCT/FI2012/050436 dated Oct. 29, 2012.
(Continued)

*Primary Examiner* — Thomas Irvin
(74) *Attorney, Agent, or Firm* — Harness, Dickey & Pierce, P.L.C.

(57) ABSTRACT

The invention relates to an electromagnetic brake and a method for making an electomagnetic brake. The electromagnetic brake comprises a frame part, an armature part movably mounted on the frame part and having a magnetic core, one or more spring elements for activating the brake by moving the said armature part forwards, an electromagnet fitted to the frame part and arranged to release the brake by pulling the said armature part backwards by resisting the said one or more spring elements, and a planar, elastically bendable damping plate fitted to be bent when the armature part is moving and, while being bent, to produce a damping force resisting the bending to dampen brake noise.

18 Claims, 4 Drawing Sheets

(51) Int. Cl.
  *F16D 65/00* (2006.01)
  *F16D 65/28* (2006.01)
  *F16D 65/097* (2006.01)
  *F16D 55/28* (2006.01)
  *F16D 121/22* (2012.01)

(52) U.S. Cl.
  CPC .............. *F16D 65/28* (2013.01); *F16D 55/28* (2013.01); *F16D 65/0971* (2013.01); *F16D 65/0977* (2013.01); *F16D 2121/22* (2013.01); *Y10T 29/49826* (2015.01)

(58) Field of Classification Search
  CPC .......... F16D 65/22; F16D 55/28; F16D 59/02; F16D 65/0971; F16D 65/0977; F16D 65/0979
  USPC ............................................. 188/72.3, 73.38
  See application file for complete search history.

(56) References Cited

U.S. PATENT DOCUMENTS

| | | | | |
|---|---|---|---|---|
| 5,154,261 A | * | 10/1992 | Tanaka et al. | 188/171 |
| 5,274,290 A | * | 12/1993 | Fischer | F16D 55/28 188/161 |
| 6,321,883 B1 | * | 11/2001 | Pfann et al. | 188/161 |
| 6,374,964 B2 | * | 4/2002 | Mustalahti et al. | 188/186 |
| 2010/0252368 A1 | * | 10/2010 | Fischer | 187/247 |
| 2012/0000742 A1 | * | 1/2012 | Sekella | 192/18 B |
| 2012/0175201 A1 | * | 7/2012 | Lahteenmaki et al. | 188/171 |
| 2014/0076675 A1 | * | 3/2014 | Olkkonen et al. | 188/205 A |
| 2015/0345571 A1 | * | 12/2015 | Yi | F16D 27/14 188/164 |

FOREIGN PATENT DOCUMENTS

| | | | | |
|---|---|---|---|---|
| EP | 1923345 A1 | * | 5/2008 | B66B 1/32 |
| EP | 1923345 A1 | | 5/2008 | |
| WO | WO 0185593 A1 | * | 11/2001 | |
| WO | WO 2005050051 A1 | * | 6/2005 | F16D 65/46 |
| WO | WO 2006049612 A1 | * | 5/2006 | B66B 11/08 |

OTHER PUBLICATIONS

Finnish Search Report of FI20115463 dated Mar. 23, 2012.
Written Opinion PCT/ISA/237 for PCT/FI2012/050436 dated Oct. 29, 2012.

* cited by examiner

ELECTROMAGNETIC BRAKE, A BRAKE, AND A METHOD FOR MAKING A BRAKE

This application is a continuation of PCT International Application No. PCT/FI2012/050436 which has an International filing date of May 4, 2012, and which claims priority to Finnish patent application number 20115463 filed May 12, 2011, the entire contents of both which are incorporated herein by reference.

FIELD OF THE INVENTION

The present invention relates to solutions for damping brake noise.

BACKGROUND OF THE INVENTION

For example, in elevator hoisting machines, the braking device generally used is a machine brake which mechanically engages the rotating part of the hoisting machine. The machine brake may be constructed e.g. as a drum brake or a disc brake. The machine brake is activated by interrupting the supply of electric current to the electromagnet of the brake. The machine brake usually has springs which, when the brake is activated, force an armature part provided with a brake pad against the braking surface of the rotating part to brake the motion of the rotating part of the hoisting machine.

The brake is released by supplying current to the electromagnet of the brake. Release of the brake is effected as the electromagnet pulls the brake pad off the braking surface of the rotating part of the hoisting machine by resisting the pushing force produced by the springs. During elevator operation, the electromagnet remains connected to the power supply, so the brake is in the released state and the elevator car can move up or down in the elevator shaft. The elevator brake may be e.g. so implemented that the same hoisting machine comprises two or more machine brakes.

When the current through the electromagnet is falling, the force applied by the spring finally exceeds the force of attraction of the electromagnet, and the brake is activated. As a result of the imbalance between the forces, the brake pad strikes against the braking surface of the rotating part of the machine. When the brake is released, the electromagnet again applies to the armature part a force opposing the spring force. When the force applied by the electromagnet to the armature part reaches a level exceeding the spring force, the air gap between the frame part and the armature part is closed and the armature part strikes against the frame part.

The impact occurring between the metallic brake parts upon activation or release of the brake may produce disturbing noise. There have been attempts to eliminate the noise problem by adding e.g. in the air gap between the frame part and the armature part a separate damper which in the released state of the brake prevents direct contact between the metal surfaces of the frame part and the armature part. The damper can be made from elastic material, such as rubber or polyurethane; the damper can also be implemented as a spring designed for this purpose, such as a helical spring or diaphragm spring.

The air gap between the frame part and the armature part may vary due e.g. to the manufacturing tolerances of the damper. The force of attraction of the electromagnet is reduced as the airgap is increased, which means that releasing the brake/keeping the brake in the released state requires an increased amount of electric current. Generally speaking, power losses in the coil of the electromagnet are increased with the increase of the airgap, and as the power losses are increased, the operating temperature of the brake also rises.

The damping power produced by the damper may also decline in the course of the service life of the brake; for example, the damping power of a damper made of polyurethane may gradually fall due to a high temperature. Again, the damping power of a spring may decline due to fatigue, among other things. Decline of the damping power involves a deterioration of the functional capacity of the damper, i.e. its ability to dampen the noise of the brake.

OBJECT OF THE INVENTION

The object of the invention is to provide solutions to the drawbacks referred to above and presented below in the description of the invention. To achieve this object, the invention discloses an electromagnetic brake according to claim 1, a brake according to claim 3 and a method according to claim 13 for making a brake. Preferred embodiments of the invention are described in the sub-claims. Inventive embodiments and inventive combinations of different embodiments are also presented in the description part of the application and in the drawings.

BRIEF DESCRIPTION OF THE INVENTION

The electromagnetic brake of the invention comprises: a frame part, an armature part movably mounted on the frame part and having a magnetic core, one or more spring elements for activating the brake by moving the said armature part forwards, an electromagnet fitted to the frame part and arranged to release the brake by pulling the said magnetic core and with it the armature part backwards by resisting the said one or more spring elements, and additionally an elastically flexible damping plate having a planar shape when in its rest position, said damping plate being fitted to be bent by the action of the force moving the armature part. The damping plate is further fitted to resist bending with a damping force that dampens the brake noise when the force moving the armature part is bending the damping plate.

The invention also relates to a brake, which comprises a frame part, an armature part movably mounted on the frame part, an air gap between frame part and armature part, counterfaces disposed facing towards each other, and additionally an elastically flexible damping plate fitted in the air gap and having a planar shape when in its rest position, said damping plate being fitted to resist bending with a damping force damping the brake noise. At least one of the aforesaid counter-faces has a non-planar shape designed to flex the damping plate.

The damping plate of the invention is fitted to be flexed preferably so that the edge portion of the damping plate is bent with respect to the middle portion of the damping plate. The damping plate of the invention having a planar shape when in its rest position makes it possible to apply the damping force uniformly over the area of the brake, so that the motion of the armature part can be controlled more accurately and within smaller tolerances than in prior-art solutions. Uniform distribution of the damping force also means that point-like damping forces are reduced, the magnitude of the damping force increases and the brake can be so designed that the motion of the armature part will be very short. The short armature part movement makes it possible for the kinetic energy bound in the armature part movement to be reduced; as the kinetic energy is reduced, the brake noise is also damped. Moreover, the damping plate of the invention can be so designed that the damping force will grow rapidly when the damping plate is flexed, even if the total flexure of the damping plate is small. By virtue of the small total flexure, the fatigue imposed on a damping plate made of e.g. spring steel is low in spite of repeated flexing, which means that the operating time of the damping plate and consequently the service life of the brake will be very long.

In a preferred embodiment of the invention, the damping force is proportional to the degree of flexure of the damping plate. In a preferred embodiment of the invention, when the brake is being released, the damping force increases strongly as the armature part is approaching the frame part of the brake, thereby effectively dissipating the kinetic energy of the armature part and producing a resistance against contact between frame part and armature part.

In a preferred embodiment of the invention, the damping plate is fitted in an air gap between the frame part and armature part counterfaces disposed facing towards each other. In a preferred embodiment of the invention, the damping plate is made of magnetizable material, preferably spring steel. Such a damping plate reduces the effective air gap of the magnetic circle of the brake, thus allowing the required force of attraction between the electromagnet and the magnetic core to be produced by a reduced magnetizing current of the electromagnet. At the same time, power losses in the electromagnet are also reduced; on the other hand, this also makes it possible to reduce the size of the magnetizing coil, e.g. the amount of copper wires in the magnetizing coil.

In a preferred embodiment of the invention, one of the aforesaid counterfaces has a concave shape to flex the damping plate. To provide a concave counterface, it is possible to machine in the counterface e.g. a cutout, whose depth determines the magnitude of the flexure of the damping plate. In a preferred embodiment of the invention, one of the aforesaid counterfaces has a convex shape to flex the damping plate. To provide a convex counterface, it is possible to machine in the counterface e.g. a bulge or bevel, whose height/inclination determines the magnitude of the flexure of the damping plate. The area of action of the damping force as well as its magnitude with respect to the path of motion of the armature part can be precisely defined from the geometry of the counterface/counterfaces, so the damping solution achieved is very accurate in respect of both manufacturing and adjustment tolerances, thus permitting a short armature part movement and at the same time a small air gap between the counterfaces to be achieved.

The brake of the invention is preferably a machine brake for an elevator, escalator or travelator.

The method of the invention for making a brake comprises forming for the brake a frame part and an armature part movably supported on the frame part, forming counterfaces disposed oppositely to each other on the frame part and armature part, forming an elastically flexible damping plate which has a planar shape when in its rest position and which, when being flexed, produces a force resisting the flexing to dampen the brake noise, and fitting the damping plate in the air gap between the counterfaces in the brake.

In a preferred embodiment of the invention, one of the aforesaid counterfaces is formed in a concave shape to flex the damping plate.

In a preferred embodiment of the invention, one of the aforesaid counterfaces is formed in a convex shape to flex the damping plate.

In a preferred embodiment of the invention, the damping plate is fitted to be engaged between the armature part and the frame part to flex the damping plate. The damping plate may be in contact with both the armature part and the frame part through the entire length of the armature part movement or, on the other hand, the damping plate may be disengaged from the armature part and/or frame part in a portion of the range of movement of the armature part.

The damping plate may be implemented in many different forms; the damping plate may be e.g. of a round (discoid) or square shape. The stiffness of the damping plate and therefore the force resisting the flexing of the damping plate can be adjusted, besides via choice of material, also e.g. by varying the thickness of the damping plate. The flexing of the damping plate can be so implemented that the edge portion of the damping plate is bent by the same amount at every point relative to the middle portion, on the other hand, the flexing may also be so implemented that only two opposite edges of the plate are bent relative to the middle portion of the plate. The damping plate is preferably made of non-compressible material, such as metal.

The above summary, as well as the additional features and advantages of the invention to be described hereinafter, will be better understood from the following description of different embodiments of the invention, which is not to be interpreted as a restriction of the field of application of the invention.

DETAILED DESCRIPTION OF PREFERRED EMBODIMENTS OF THE INVENTION

Figure 1:
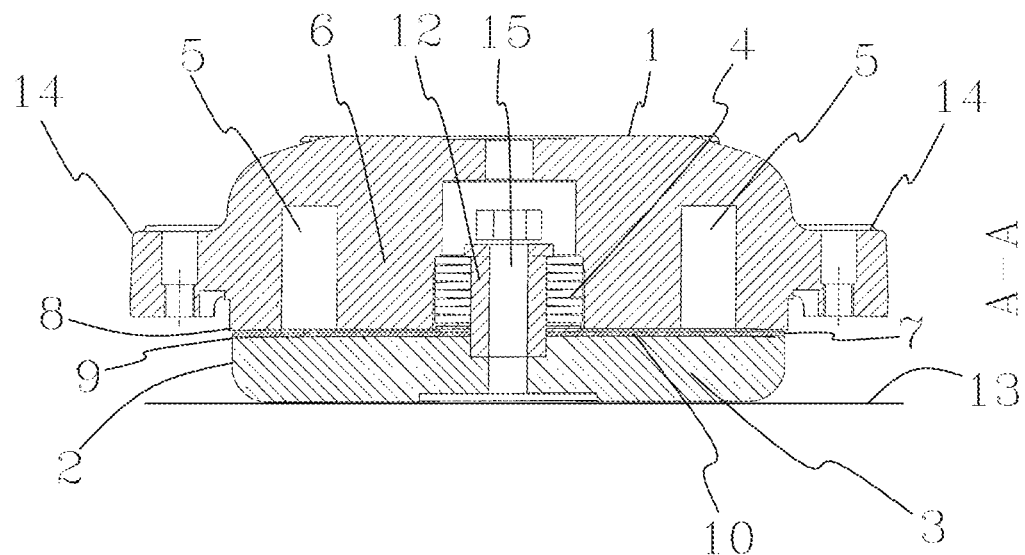
FIG. 1 represents a machine brake according to the invention for an elevator hoisting machine
Figure 2:
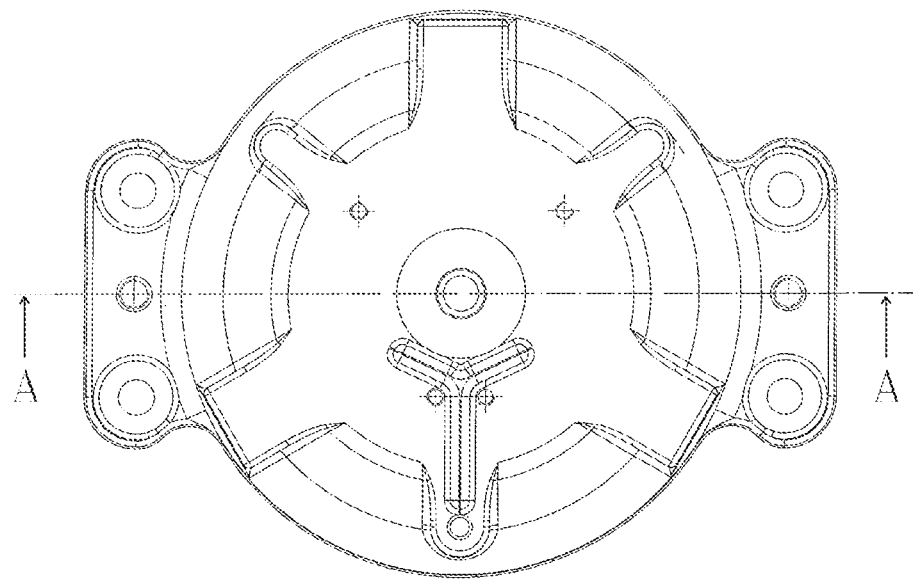
FIG. 2 represents the machine brake of FIG. 1 in top view

In FIG. 1, the machine brake for an elevator hoisting machine presented in FIG. 2 is shown in cross-sectional view along line A-A. The frame part 1 of the machine brake is secured by mounting lugs 14 to the stationary machine frame of the hoisting machine. The frame part 1 is provided with an electromagnet, which comprises a magnetizing coil 5 and a coil core 6 made of iron. The armature part 2 of the machine brake is movably secured to the frame part 1 with a bolt 15 and a sleeve 12 around the bolt 15, so that the armature part 2 can move along a determined path relative to the frame part 1. By moving the sleeve 12 along the bolt 15, it is also possible to adjust the distance of movement of the armature part 2, thereby adjusting the air gap 10 between the armature part 2 and the frame part 1. Springs 4 apply a pushing force between the frame part 1 and the armature part 2, so that the brake is activated to brake the motion of the rotating part of the hoisting machine when the springs 4 press the armature part 2 against the brake drum 13 of the rotating part of the hoisting machine. The range of action of the springs 4 is so designed that the pushing force generated by the springs 4 is constant with respect to the path of the armature part 2 or that only a small change in the pushing force occurs when the position of the armature part 2 changes. The brake is released by supplying current to the magnetizing coil 5 of the electromagnet; the current flowing in the coil 5 produces a force of attraction between the coil core 6 and the magnetic core 3 of the armature part made of magnetizable material, thus pulling the armature part 2 out of contact with the brake drum 13 by counteracting the pushing force of the springs 4.

When the brake is released and the armature part 2 starts moving towards the frame part 1, the force of attraction applied to the armature part 2 by the electromagnet begins to grow, because the air gap 10 between the coil core 6 and the magnetic core 3 in the brake magnetic circuit begins to decrease at the same time. The problem is that, due to the increasing force of attraction, the kinetic energy of the armature part 2 tends to grow high, which would result in a noisy impact of the armature part 2 against the frame part 1 of the brake.

Figure 5:
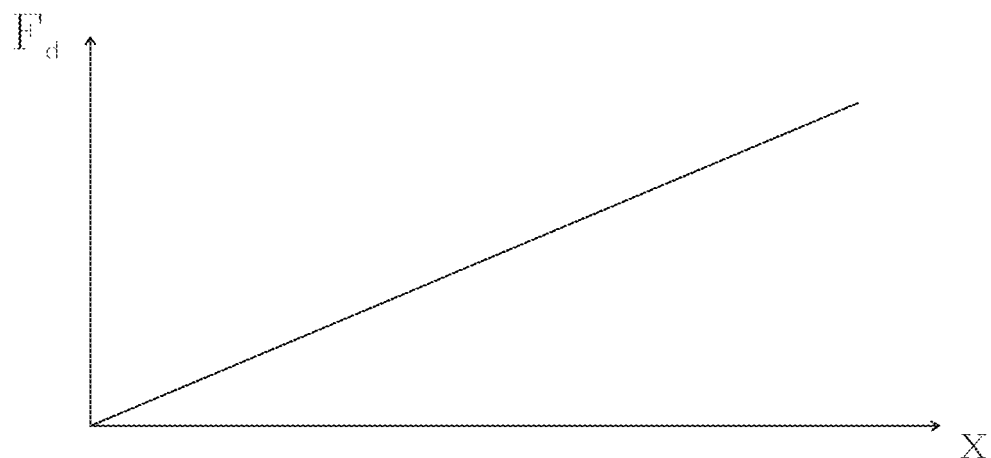

To solve this problem, a damping plate 7 made of spring steel has been fitted in the air gap 10 between the coil core 6 and the magnetic core 3, see FIG. 1. The coil core 6 counterface 8 adjacent to the air gap 10 has been made somewhat concave, and, correspondingly, the magnetic core 3 counterface 9 of the armature part adjacent to the air gap has been made somewhat convex. Consequently, as the armature part 2 is moving towards the frame part 1 when the brake is being released, the damping plate 7 tends to bend in such manner that the edge portion 16 of the damping plate is bent relative to the middle portion 17. The damping plate resists bending with force $F_d$, which is proportional to the magnitude of the flexure x, see FIG. 5. The force $F_d$ grows rapidly as the flexion advances and the armature part 2 is approaching the frame part. The force also acts in the opposite direction relative to the motion of the armature part 2, so the force $F_d$ tends to resist contact between the counterfaces 8, 9 of the frame part 1 and armature part 2, thereby effectively damping the disturbing noise produced by the impact between the armature part 2 and the frame part 1.

Figure 3:
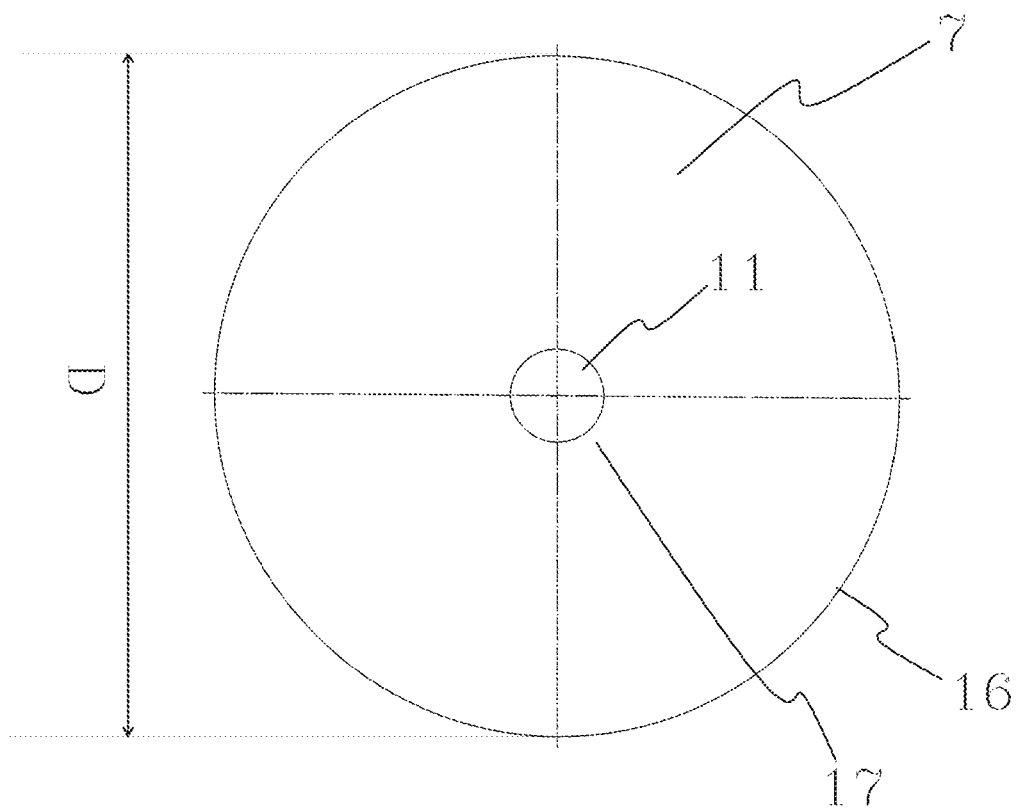
FIG. 3 represents a brake damping plate used in the machine brake of FIGS. 1 and 2

FIG. 3 represents the circular damping plate 7 used in the machine brakes of FIGS. 1 and 2, depicted in top view. The diameter of the damping plate 7 is substantially equal to the diameter D of the frame part 1 and armature part 2 counterfaces 8, 9 adjacent to the air gap 10, see FIG. 1. The flexing of the damping plate 7 takes place in such a way that the rim portion 16 of the damping plate is bent with respect to the middle portion 17. Thus, the force $F_d$ applied by the damping plate 7 is evenly distributed over the entire length of the rim portion 16 and, on the other hand, in the middle portion 17 of the damping plate the force is distributed uniformly over a maximal area; consequently, the pressure applied to the surfaces pressed against each other when the damping plate 7 is bent remains low. Moreover, the damping plate 7 largely fills the air gap 10 between the frame part 1 and the armature part 2. As the damping plate 7 is made of magnetizable material, the effective air gap of the magnetic circle of the brake is reduced, the reluctance of the magnetic circle is reduced and the current requirement of the magnetizing coil 5 is reduced as well. The damping plate 7 is provided with a hole 11 in which the bolt 15 and sleeve 12 are placed, so that, together with the springs 4 pressing against the damping plate 7, they center the damping plate 7 in position in the air gap 10.

Figure 4A:
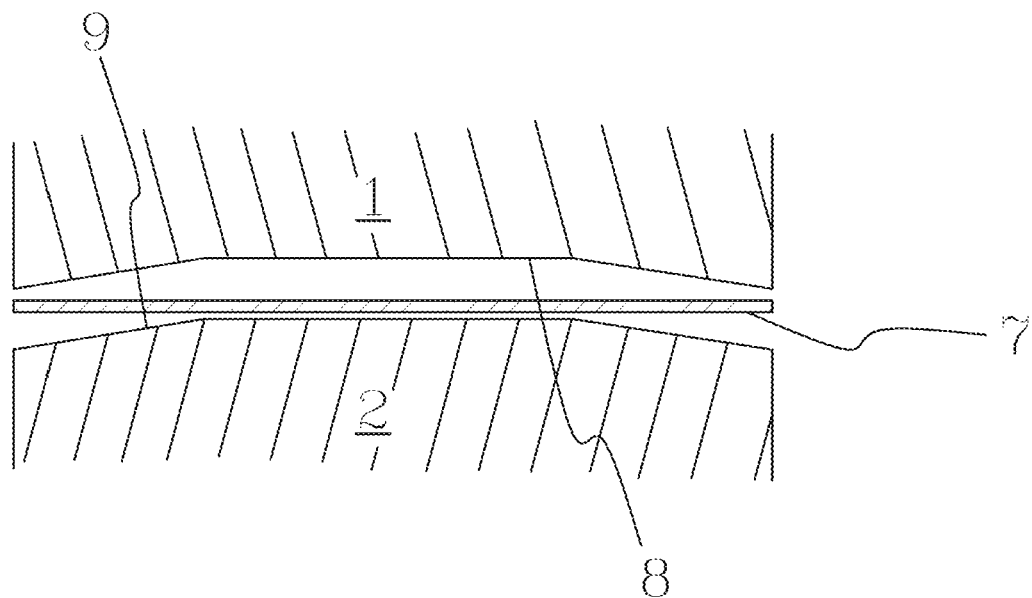
FIGS. 4a, 4b, 4c present more detailed illustrations of some possible geometric designs of the counterfaces in the electromagnetic brake of the invention FIG. 5 visualizes a graph of the damping force $F_d$ as a function of flexure x of the damping plate
Figure 4B:
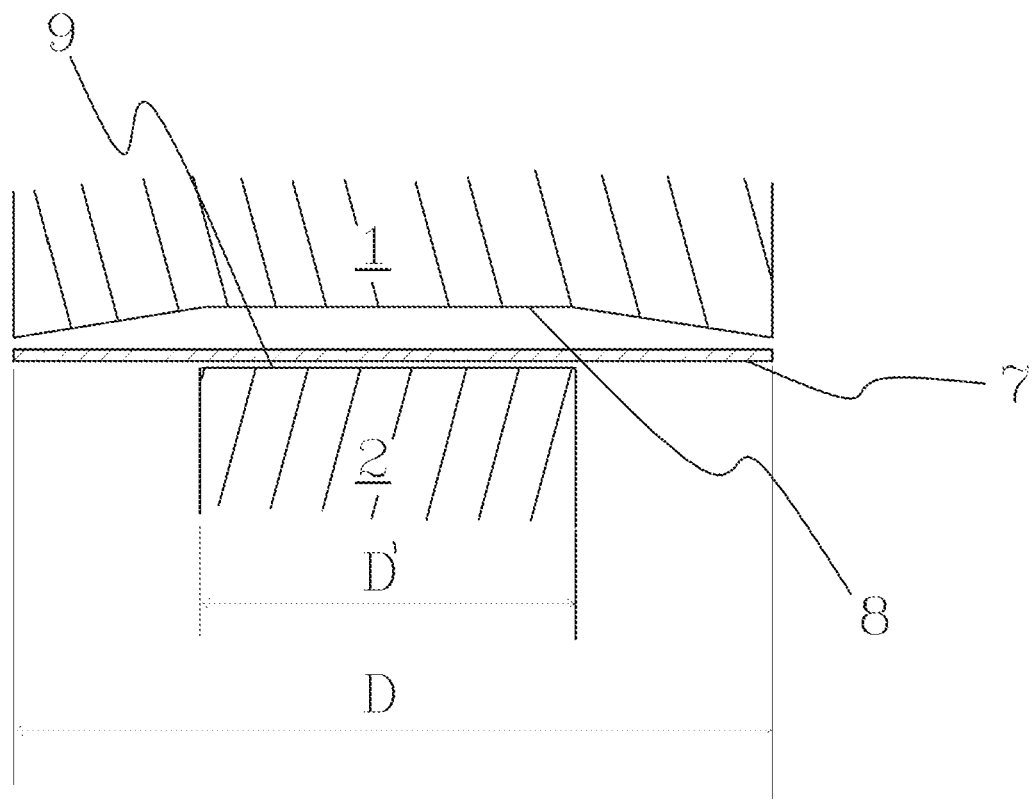
Figure 4C:
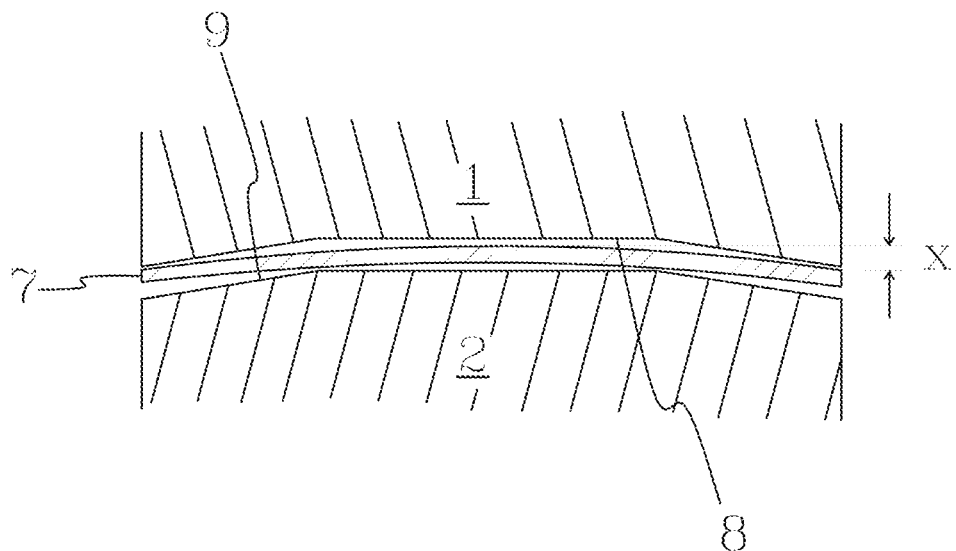

FIGS. 4a, 4b and 4c visualize a few geometric designs that can be used in shaping the counterfaces 8, 9 of the coil core 6 and magnetic core 3 of the brake, adjacent to the air gap. In the figures, certain features, such as convexity/concavity of the counterface, are exaggerated to visualize the working principle.

In the solution of FIG. 4a, the coil core 6 counterface 8 adjacent to the air gap 10 has been beveled into a concave shape and the magnetic core 3 counterface 9 adjacent to the air gap 10 has been beveled into a convex shape, in such manner that the bevel angles α are equal in both counterfaces. In the solution of FIG. 4b, the coil core 6 counterface 8 adjacent to the air gap 10 has been beveled into a concave shape while the magnetic core 3 counterface 9 adjacent to the air gap 10 is flat; however, in this case, the diameter D' of the magnetic core 3 counterface 9 is substantially smaller than the diameter D of the coil core 6 counterface 8 and that of the damping plate 7. In the solution of FIG. 4c, the damping plate 7 has been pre-tensioned from its rest position so that the damping plate 7 is in a slightly bent position even when the brake is in the activated state. "Rest position" of the damping plate 7 thus refers to a position in which the damping plate 7 is in a non-flexed state (FIGS. 4a, 4b).

The solutions of FIGS. 4a-4c could also be implemented the other way round, by employing an arrangement where the magnetic core 3 counterface 9 adjacent to the air gap 10 is concave and the coil core 6 counterface 8 adjacent to the air gap 10 in the embodiments of FIGS. 4a and 4c is convex, and where the coil core 6 counterface 8 adjacent to the air gap 10 in the embodiment of FIG. 4b is flat and has a smaller diameter than the diameter D of the magnetic core 3 counterface 9 adjacent to the air gap 10 and that of the damping plate 7.

It is obvious to a person skilled in the art that different embodiments of the invention are not limited to the examples described above, but that they may be varied within the scope of the claims presented below.

It is further obvious to the skilled person that the damping solution of the invention is applicable for use both in drum brakes and in disc brakes.

The invention claimed is:

1. An electromagnetic brake, comprising:
   a frame having a frame counterface;
   an armature movably mounted on the frame and including an armature counterface and a magnetic core, the armature counterface facing the frame counterface;
   at least one or more springs configured to activate the electromagnetic brake by moving the armature forwards;
   an electromagnet fitted to the frame and configured to release the electromagnetic brake by pulling the armature backwards by resisting the at least one or more springs; and
   an elastically bendable damping plate between the frame counterface and the armature counterface, the elastically bendable damping plate having at least a surface with a diameter corresponding to one or more of the frame counterface and the armature counterface, wherein
      a shape of at least one of the frame counterface and the armature counterface is one of concave and convex to bend the elastically bendable damping plate during brake release when a force moves the armature backwards towards the frame counterface, and
      during braking when the springs move the armature forwards, the surface of the elastically bendable damping plate corresponding to the frame counterface and the armature counterface is configured to have a planar shape.

2. The electromagnetic brake according to claim 1, wherein the elastically bendable damping plate is fitted in an air gap between the frame counterface and the armature counterface.

3. The electromagnetic brake according to claim 1, wherein the damping force is proportional to a magnitude of a flexure of the elastically bendable damping plate.

4. The electromagnetic brake according to claim 1, wherein a rim portion of the elastically bendable damping plate is configured to bend relative to a middle portion of the elastically bendable damping plate when the electromagnetic brake is released.

5. The electromagnetic brake according claim 1, wherein the damping force produced by the elastically bendable damping plate resists contact between the frame counterface and the armature counterface.

6. The electromagnetic brake according to claim 5, wherein the damping force is proportional to a magnitude of a flexure of the elastically bendable damping plate.

7. The electromagnetic brake according to claim 5, wherein the elastically bendable damping plate dissipates kinetic energy of the armature.

8. The electromagnetic brake according to claim 1, wherein the elastically bendable damping plate is made of spring steel.

9. The electromagnetic brake according to claim 1, wherein the electromagnetic brake is configured for at least one of an elevator, an escalator and a travellator.

10. The electromagnetic brake according to claim 1, wherein the elastically bendable damping plate includes a hole for aligning the elastically bendable damping plate in center position.

11. The electromagnetic brake according to claim 1, wherein the damping force is uniform over a maximal area in a middle portion with respect to a rim portion of the elastically bendable damping plate.

12. The electromagnetic brake according to claim 1, wherein the elastically bendable damping plate is configured to apply the damping force to resist bending at a middle portion of the surface of the elastically bendable damping plate to dampen the brake noise.

13. The electromagnetic brake according to claim 1, wherein, during the brake release, the frame counterface is configured to press an edge portion of the elastically bendable damping plate in a first direction towards the armature counterface and the elastically bendable damping plate is configured to apply a damping force in a second direction to dampen a brake noise by resisting contact with the frame counterface and the armature counterface, the second direction being opposite to the first direction.

14. A brake, comprising;
a frame having a frame counterface;
an armature movably mounted on the frame and including an armature counterface, the armature counterface facing the frame counterface such that an air gap is therebetween;
at least one or more springs configured to activate the brake by moving the armature forwards; and
an elastically bendable damping plate fitted in the air gap between the frame counterface and the armature counterface, the elastically bendable damping plate having at least a surface with a diameter corresponding to one or more of the frame counterface and the armature counterface, wherein,
during braking when the springs move the armature forwards, the surface of elastically bendable damping plate corresponding to the frame counterface and the armature counterface is configured to have a planar shape, and
at least one of the frame counterface and the armature counterface is non-planar to bend the elastically bendable damping plate when a force moves the armature backwards towards the frame counterface during brake release to release the brake.

15. The brake according to claim 14, wherein, during the brake release, the frame counterface is configured to press an edge portion of the elastically bendable damping plate in a first direction towards the armature counterface and the elastically bendable damping plate is configured to apply a damping force in a second direction to dampen a brake noise by resisting contact with the frame counterface and the armature counterface, the second direction being opposite to the first direction.

16. A method for making a brake, the method comprising:
forming an armature movably supported on a frame of the brake;
forming counterfaces on the frame and the armature to face each other;
fitting at least one or more springs configured to activate the brake by moving the armature forwards;
forming an elastically bendable damping plate having at least a surface with a diameter corresponding to one or more of the frame counterface and the armature counterface; and
fitting the elastically bendable damping plate in an air gap between the frame counterface and the armature counterface, wherein,
a shape of at least one of the frame counterface and the armature counterface is one of concave and convex to bend the elastically bendable damping plate during brake release when a force moves the armature backwards towards the frame counterface, and
during braking when the springs move the armature forwards, the surface of the elastically bendable damping plate corresponding to the frame counterface and the armature counterface is configured to have a planar shape.

17. The method for making the brake according to claim 16, further comprising:
fitting an electromagnet to the frame, the electromagnet being configured to release the brake by pulling the armature backwards by resisting the at least one or more springs.

18. The method for making the brake according to claim 16, wherein, during the brake release, the frame counterface is configured to press an edge portion of the elastically bendable damping plate in a first direction towards the armature counterface and the elastically bendable damping plate is configured to apply a damping force in a second direction to dampen a brake noise by resisting contact with the frame counterface and the armature counterface, the second direction being opposite to the first direction.

* * * * *